D. MARINSKY.
FASTENING DEVICE.
APPLICATION FILED SEPT. 24, 1915.
1,196,009.
Patented Aug. 29, 1916.
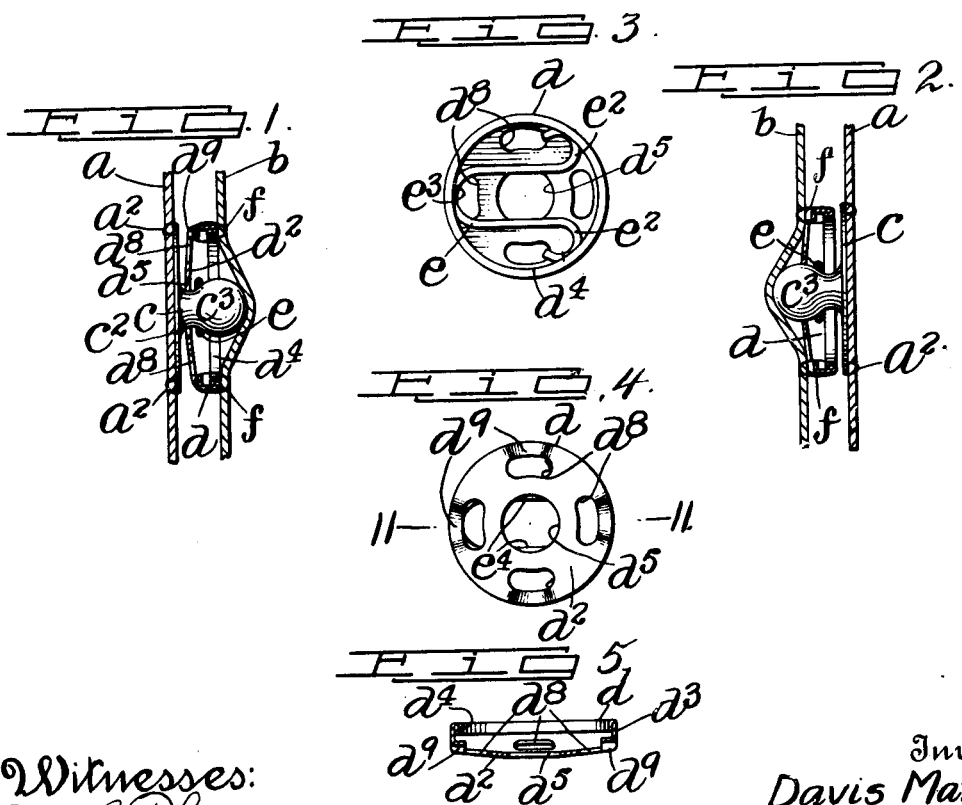
Witnesses:
Inventor
Davis Marinsky.
By his Attorneys

UNITED STATES PATENT OFFICE.

DAVIS MARINSKY, OF NEW YORK, N. Y.

FASTENING DEVICE.

1,196,009.   Specification of Letters Patent.   Patented Aug. 29, 1916.

Application filed September 24, 1915. Serial No. 52,345.

*To all whom it may concern:*

Be it known that I, DAVIS MARINSKY, a citizen of the United States, and residing at New York, in the county of New York and State of New York, have invented certain new and useful Improvements in Fastening Devices, of which the following is a specification, such as will enable those skilled in the art to which it appertains to make and use the same.

This invention relates to fastening devices and particularly to devices of this class of the ball and socket type, and the object thereof is to provide an improved fastening device of this class designed particularly for use as a garment fastener, but which may be employed wherever such devices are required.

In the accompanying drawing, I have shown my improved fastening device employed as a garment fastener, or for connecting two parts of the garment, and the invention is fully disclosed in the following specification, of which the accompanying drawing forms a part, in which the separate parts of my improvement are designated by suitable reference characters in each of the views, and in which:—

Figure 1 is a sectional view showing one method of using my improved fastening device; Fig. 2 a similar view showing another method of using said device; Fig. 3 an inside view of the socket member of the device; Fig. 4 a back view of the member shown in Fig. 3; Fig. 5 a sectional view of the socket member of the fastening device but showing only a part thereof taken on line 11—11 of Fig. 4.

In the accompanying drawing, I have shown at $a$ and $b$ two parts of a garment to be connected, and my improved fastening device consists of a ball or knob member $c$ and a socket member $d$.

The ball or knob member $c$ comprises a plate $c^2$ provided centrally of one side with a knob $c^3$ and the plate $c^2$ is stitched or adapted to be stitched to one of the garment members $a$—$b$, and in the drawing is shown stitched to the garment member $a$, at $a^4$, and for this purpose said plate is provided around its perimeter with apertures not shown but through which the stitches at $a^2$ are passed.

The socket member $d$ is approximately cup-shaped in form, and comprises a back plate $d^2$ which is preferably concavo-convex in form and provided with an annular rim $d^3$, the edge of which is folded inwardly as shown at $d^4$, and forms an annular shoulder within the cup-shaped device formed by the back plate $d^2$, and the annular rim $d^3$, and placed in said device is a yoke-shaped locking spring $e$ the ends of the side portions of which are provided with loops, rings or eyes $e^2$ and the head portion $e^3$ of the yoke-shaped locking spring $e$ and the loops, rings or eyes $e$ fit under the annular shoulder $d^4$, and said annular shoulder securely holds the yoke-shaped locking spring in position, as clearly shown in Fig. 3.

The back part of the socket member $d$ is provided with a central aperture $d^5$ which is slightly greater in transverse dimensions than the transverse distance between the side portions $e^4$ of the locking spring $e$. The back part $d^2$ of said socket member is also provided near its perimeter with a plurality of circumferentially arranged slots or openings $d^8$, preferably four in number, and said back $d^2$ outwardly of said slots or openings is depressed or forced inwardly as shown at $d^9$ to form inwardly directed parts which facilitate the attaching of the socket member $d$ to the garment member $b$ when the device is used as shown in Fig. 1, in which operation, the stitches or threads $f$ fit in the depressions $d^9$ but when the device is used as shown in Fig. 2 the stitches or threads $f$ are passed around the rim portion of the part $d$ of the fastening device, as shown in said figure.

With this construction the fastening device may be used as shown either in Fig. 1, or in Fig. 2, or in other words, the position of the part $d$ of the fastening device may be reversed on the same side of the goods to which it is attached. When the device is used, as shown in Fig. 1, the ball or knob member $c^3$ is first passed through the back of the part $d$ of the fastening device, and then through the spring locking device $e$, but when the fastening device is used as shown in Fig. 2, the ball or knob member $c^3$ is first passed through the spring locking device $e$ and then through the back portion of the part $d$ of the fastening device. With either construction the operation of the spring locking device $e$ is the same, and when the ball or knob member $c^3$ is passed therethrough said locking device expands and afterward contracts so as to hold the ball or knob member and the result with either form of construction, and in either position in which said form of construction may be employed will be the same as with other fastening devices of this class.

One of the chief features of this invention is in the fact that the part $d$ may be reversed on the same side of the goods to which it is attached and the ball or knob member inserted from either side thereof, and either part of the device may be secured, or applied to either of the parts $a$ or $b$ of the garment as will be readily understood, and no part of the fastening device will show when in use.

Although I have shown and described the preferred form of my improvement, it will be understood that my invention is not limited to the details of construction herein shown and described, and changes therein and modifications thereof may be made, within the scope of the appended claim, without departing from the spirit of my invention or sacrificing its advantages.

Having fully described my invention, what I claim as new and desire to secure by Letters Patent, is:—

A garment fastener comprising a disk having a stud provided with a knob, and a socket member consisting of a back plate substantially concavo-convex in form and provided with an annular rim, the edge of which is folded inwardly upon itself and forms an annular shoulder within the socket member, a yoke-shaped locking spring removably secured in said socket member by said annular shoulder, and said back plate being also provided with a central aperture for the passage of the knob and with slots for the passage of the threads used in securing the socket member to the garment, said back plate also having inwardly depressed portions arranged between the slotted portions and the perimeter for receiving the attaching threads.

In testimony that I claim the foregoing as my invention I have signed my name in presence of the subscribing witnesses this 21st day of September 1915.

DAVIS MARINSKY.

Witnesses:
C. MULREANY,
H. E. THOMPSON.